United States Patent

[11] 3,593,590

[72] Inventors Elmer M. Kesl;
Carmen S. Phillips, both of Downers Grove, Ill.
[21] Appl. No. 16,177
[22] Filed Mar. 3, 1970
[45] Patented July 20, 1971
[73] Assignee International Harvester Company
Chicago, Ill.

[54] IDLER ASSEMBLY
10 Claims, 3 Drawing Figs.
[52] U.S. Cl. ..................................72/242.14 R,
74/242.11 A
[51] Int. Cl. ...................................... F16h 7/10,
F16h 7/12
[50] Field of Search.......................... 74/242.14
R, 242.11 A, 242.11 R

[56] References Cited
UNITED STATES PATENTS
3,285,085 11/1966 Graham........................ 74/242.14 (R)
3,325,095 6/1967 Mueller et al..............74/242.14 (R) X
3,457,797 7/1969 Ashton et al...............74/242.14 (R) X
3,463,024 8/1969 Blanshine et al...........74/242.14 (R) X Primary Examiner—Leonard H. Gerin
Attorney—Noel G. Artman ABSTRACT: A mounting for an idler from a frame which has an elongated slot. A journal bolt for the idler is slidably secured to the frame in the slot and is connected to one end of an adjusting element which fits at its other free end into a spring and has a nut threaded thereon abutting the spring. The free end of the adjusting element extends with the spring into a housing which has openings in opposed walls. A spring steel U-shaped pin is collapsed and inserted into the openings and in spreading out locks with the housing portions about the margins of the openings. The pin has corrugated legs which hold the pin wedged to the walls of the housing and the legs form an opening therebetween which receives the free end of the adjusting element preventing withdrawal of the pin. The pin seats the other end of the spring and the threaded nut adjusts the compression of the spring.

PATENTED JUL 20 1971  3,593,590

INVENTORS
ELMER M. KESL
CARMEN S. PHILLIPS
BY John J. Kowalik ATT'Y.

IDLER ASSEMBLY

DESCRIPTION OF THE PRIOR ART

Various types of prior art devices have been heretofore used for the purpose of adjusting an idler wheel of a belt or chain drive system. In general these employed spring-actuated assemblies which were urged in a direction effecting tightening of the chain or belt. The mounting of these types of assemblies, particularly where the idlers are spring loaded, have been complicated or have not been entirely satisfactory either because the assembly required excessive adjustment and then locking of the parts in the adjusted position or the adjustment was tedious or would involve time-consuming assembly.

SUMMARY OF THE INVENTION

The present invention is directed to a spring-loaded idler assembly and more specifically to a novel simplified structure which is durable and efficient.

A general object of the invention is to provide a novel spring-loaded idler assembly in which an adjusting rod or bar is used which carries the idler and which is spring loaded, the spring being disposed within the housing which comprises opposed walls with transverse aligned apertures therethrough receiving a novel yieldable support for the base end of the spring wherein the yieldable support is in the shape of a hairpin with corrugations on each of its legs which are adapted to interlock with the wall portions of the housing so as to retain the support pin in operating position.

A further object of the invention is to provide a novel assembly wherein the locking pin so constructed that the corrugations thereof define an aperture between the legs which in certain positions receives the spring-mounting adjusting bolt therein and thus the bolt and the pin cooperate to prevent withdrawal of the pin.

A still further object of the invention is to provide a novel assembly which is relatively easy to assemble and dismantle.

These and other objects and advantages inherent in and encompassed by the invention will become more readily apparent from the specification and the drawings wherein.

DESCRIPTION OF THE INVENTION

Figure 1:
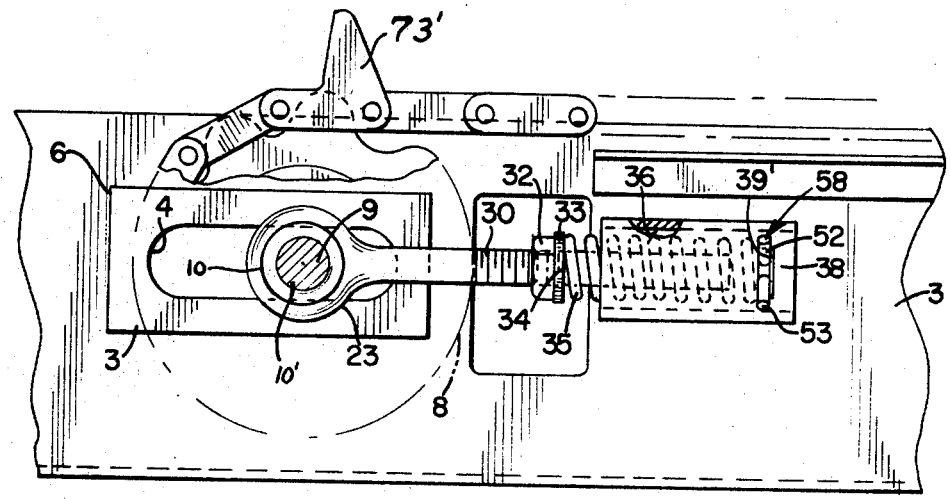
FIG. 1 is a plan view of the novel spring-loaded idler assembly.
Figure 2:
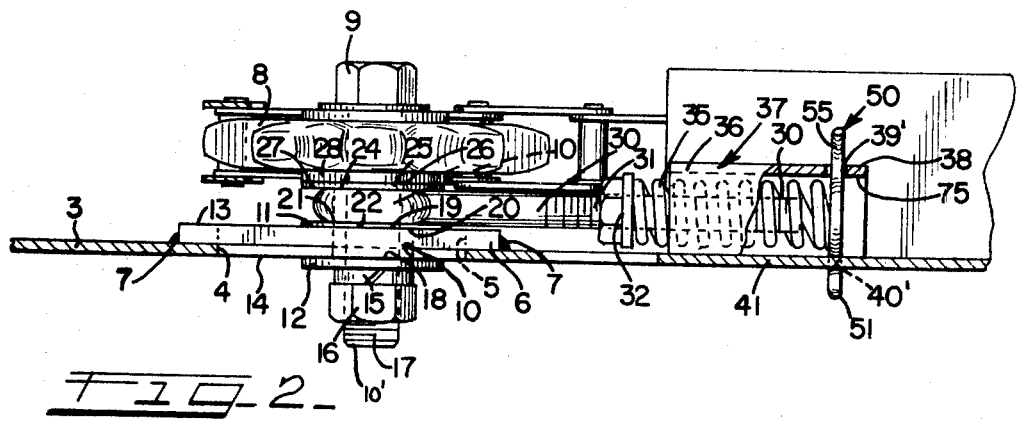
FIG. 2 is a side elevational view thereof partly in section.
Figure 3:
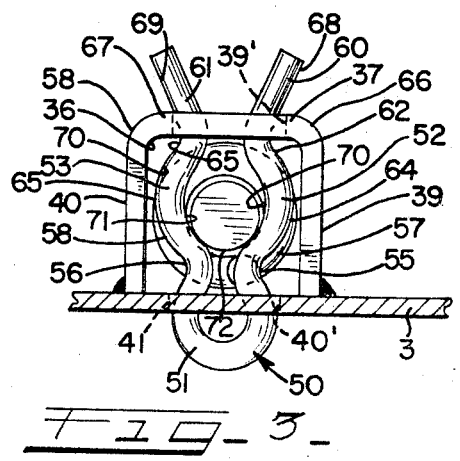
FIG. 3 is an end view.

As best seen in FIG. 2 the support frame 3 comprises elongated slot 4 which is aligned with a similar slot 5 in a wear plate 6 suitably secured as by welding at 7, 7 to the frame whereby making the same part thereof. An idler sprocket 8 is positioned at one side of the frame 3 and is rotatably mounted on a bolt and nut assembly 9 which has a shank 10' extending through the slots 4 and 5, and mounts a spacer 10 between opposed top and bottom washers 11 and 12 which respectively engage the top side 13 and bottom side 14 of the wall 3 of the frame member, said washers being larger than the lateral width dimension of the slot. The lower washer 12 is held between a lock washer 15 and nut 16 on the lower end 17 of the shank 10' and engages the lower edge 18 of the spacer. The spacer 10 has its upper end 19 seated against the underside 20 of the top washer 11 and the upper side 21 of the washer 11 seats on the bottom 22 of an eye 23 which is sleeved over the shank 10', the eye 23 bearing at its upper side as at 24 against the underside of a washer 25 which on its top 26 seats against the bottom end 27 of a bearing 28 which is incorporated in the hub of the idler wheel 8. Thus the means 9 mounting the idler wheel rotatably is also slidable lengthwise of the slot and such movement is controlled by an adjusting element 30 which incorporates the said eye 23 at one end. The adjusting element 30 is threaded at its distal end portion 31 and mounts a nut 32 in the washer 33 which of course is seated at 34 for one end of the compression spring 35. Spring 35 extends into the longitudinal interior opening 36 of the housing 37.

The housing 37 is a quadrilateral preferably square structure and has an upper wall 38, a pair of sidewalls 39 and 40 and the portion 41 of the frame member 3 forming the bottom wall of the housing whereby the housing is an open-ended tubular structure.

A pair of apertures 39' and 40' are aligned transversely of the housing and formed respectively in the walls 38 and 41, it being noted that the aperture 40' is considerably smaller than the aperture 39'.

A resilient retainer generally designated 50 or abutment member is in the shape of a hairpin or U-shaped element and comprises an arcuate bight portion 51 and a pair of laterally spaced legs 52, 53. The member 50 may be referred to as a pin and is made preferably of spring steel so that the legs are normally in a spread-apart set position and may be deflected toward each other in order to diminish the width dimension of the pin. It will be appreciated that the head portion 51 of the pin is smaller than the width dimension of the opening 39'. The legs 52, 53 are corrugated and are indented at their forward portions as at 55 and 56 and provided with arcuate sections 57, 58 intermediate their ends and the outer ends of the arcuate sections submerged into inner ends of outwardly diverging end portions 60 and 61 which form V-shaped pockets or indents at 62 and 63. It will be observed that the pin 50 after it is inserted to the opening 39' will compress the legs and will be deflected toward each other in order to bypass the intermediate portions 64, 65 and then will spread apart in order to lock the end portions 66 and 67 to the housing wall 37. The external sides 68 and 69 of the leg portions 60, 61 of the pin are urged through the spreading-apart action of the legs to wedge against the margins of the wall portion 66 and 67.

It will be observed that in certain positions the distal end portion 30 of the adjusting element extends through the opening 70 which is defined between the outwardly bowed portions 64, 65 of the pin. The internal surfaces 71 form a support for the periphery 72 of the distal portion 30 of the adjusting bolt. The bolt thus prevents withdrawal of the pin and the pin serves as the support for the bolt.

If the bolt portion 30 extends into the aperture 70 of the pin, in order to disassemble it the chain 73' would be removed and the element 30 moved leftwardly until the distal portion 30 would withdraw from the opening 70 in the pin. Thereupon the leg portions 60, 61 would be clamped together to such an extent that the enlarged portion 64, 65 of the abutment member 50 would pass through the enlarged opening 39' whereupon the member 50 would be withdrawn from the openings. Of course the bolt 9 could disassemble from the eye 23 and then the element 30 and the spring could be withdrawn from the housing or the chain wrapped about the sprocket 8 could be removed to allow the assembly to move leftwardly (FIG. 2).

The housing serves as a protection for the spring and prevents any material from dropping in between the coils and causing malfunction of the spring. The housing also serves the function of maintaining the adjusting element in alignment with the longitudinal axis of the slot and confines the spring so that it acts in an axial direction.

A novel, efficient, simple and effective arrangement has been disclosed wherein parts may be readily loosened merely by backing off the nut 30 so that the spring relaxes by extending within the limits of the housing which is open at its rear end as at 75. Pin 50 is removed and then the spring may be withdrawn and the other parts may be readily disassembled or assembled without the necessity of assembling the pieces with the spring under stress.

What we claim is:

1. An idler assembly comprising a support, an idler wheel, means rotatably mounting the idler wheel, means for accommodating movement of the wheel radially thereof, said means including a threaded element connected to said means mounting the wheel and extending generally radially therefrom and terminating in a distal end portion, a housing on the support extending lengthwise of the threaded element and receiving said distal end portion thereof, said housing having opposed walls with apertures therein aligned transversely of said element, resilient abutment means extending through said apertures and contoured to releasably interlock with the housing, spring means mounted on said end portion of said element and projecting within the housing and seated at one end of said abutment means, and adjustable abutment means threaded on the element in engagement with the opposite end of the spring and adapted to be advanced toward and away from the spring for varying the compression thereof.

2. An idler assembly according to claim 1 wherein said resilient abutment means is made of spring steel and comprises a generally U-shaped member having a pair of laterally spaced legs and an interconnecting bight portion and locking means on each leg comprising a V-shaped contoured outer end portion of the leg providing a pocket receiving an adjacent portion of the housing wall therein in interlocking engagement therewith, said legs adapted to be deflected toward each other to enter and withdraw said member with respect to said apertures.

3. The invention according to claim 1 and said resilient abutment means comprising a U-shaped member having a pair of legs and an interconnecting bight portion the legs having intermediate outwardly bowed portions defining a generally circular opening therebetween adapted to receive said end portion of said adjusting element.

4. The invention according to claim 3 said legs having outwardly spread outer end portions extending from said bowed portions and developing notches therewith receiving portions of one wall of the housing at opposite sides of the opening in the wall, said legs biased outwardly and tightly engaging said wall portions.

5. The invention according to claim 4 and said bight portion being of less width than the span of the legs spread apart and the opening in the other wall of the housing being smaller then in the one wall to closely confine said bight portion therein.

6. The invention according to claim 3 and said bight portion projecting out of the housing through one wall thereof and the legs having end portions projecting out of the housing from the other wall.

7. The invention according to claim 1, and said resilient abutment means comprising a U-shaped member with legs having a plurality of corrugations which interlock with the edges of at least one of said apertures.

8. The invention according to claim 7 and said legs defining a generally circular opening therebetween accommodating said adjusting element therethrough, said element preventing deflection of the legs toward each other and thus withdrawal of said member.

9. The invention according to claim 8 and one of said apertures being smaller than the other and said legs biased to a spread-apart position within the larger aperture in engagement with the margins thereof.

10. The invention according to claim 9 and said member being disposed perpendicular to the spring and operative to support said adjusting element at the distal end portion thereof.